United States Patent
Motomura et al.

[11] Patent Number: 6,103,323
[45] Date of Patent: Aug. 15, 2000

[54] CIRCULAR DICHROISM OPTICAL ELEMENT, APPARATUS THEREOF, AND LIQUID CRYSTAL POLYMER

[75] Inventors: Hironori Motomura; Kyoko Izumi; Shusaku Nakano; Amane Mochizuki, all of Osaka, Japan

[73] Assignee: Nitto Denko Corporation, Osaka, Japan

[21] Appl. No.: 08/981,043

[22] PCT Filed: Mar. 3, 1997

[86] PCT No.: PCT/JP97/00642

§ 371 Date: Dec. 11, 1997

§ 102(e) Date: Dec. 11, 1997

[87] PCT Pub. No.: WO97/40410

PCT Pub. Date: Oct. 30, 1997

[30] Foreign Application Priority Data

Apr. 22, 1996 [JP] Japan ................................. 8-126432

[51] Int. Cl.[7] .......................... C09K 19/38; G02B 5/30; G02F 1/1335; C08F 20/26

[52] U.S. Cl. .................. 428/1.3; 428/1.1; 252/299.01; 252/586; 349/98; 349/183; 359/352; 359/353; 359/483; 526/318.42; 526/381.44

[58] Field of Search ................. 252/299.01, 586; 349/182, 183, 98; 428/1.1, 1.3; 359/352, 353, 483; 526/318.42, 318.44

[56] References Cited

U.S. PATENT DOCUMENTS

| | | | |
|---|---|---|---|
| 4,743,675 | 5/1988 | Watanabe | 528/328 |
| 5,103,332 | 4/1992 | Kaneko et al. | 359/98 |
| 5,235,443 | 8/1993 | Barnik et al. | 359/37 |
| 5,332,522 | 7/1994 | Chen et al. | 252/299.01 |
| 5,378,393 | 1/1995 | Chen et al. | 252/299.01 |
| 5,514,296 | 5/1996 | Chen et al. | 252/299.01 |

FOREIGN PATENT DOCUMENTS

0 407 944   1/1991   European Pat. Off. .

*Primary Examiner*—Shean C. Wu
*Attorney, Agent, or Firm*—Sughrue, Mion, Zinn, Macpeak & Seas, PLLC

[57] ABSTRACT

A circular dichroism optical element having the solidified layer of a liquid crystal polymer comprising a Grandjean oriented cholesteric liquid crystal phase, a liquid crystal display apparatus using the optical element, and a liquid crystal polymer composed of, as the component, a copolymer comprising at least two kinds of specific acrylic monomer units.

18 Claims, 8 Drawing Sheets

CIRCULAR DICHROISM OPTICAL ELEMENT, APPARATUS THEREOF, AND LIQUID CRYSTAL POLYMER

This application is a 371 of PCT/JP97/00642, filed Mar. 3, 1997.

TECHNICAL FIELD

The present invention relates to a circular dichroism optical element comprising a solid layer of a liquid crystal polymer, a liquid crystal display apparatus or a backlight apparatus excellent in brightness utilizing the optical element, and a liquid crystal polymer suitable for forming the optical element.

BACKGROUND ART

Hitherto, a circular dichroism optical element formed by enclosing a fluid cholesteric liquid crystal comprising a low molecular weight material between substrates, such as glass plates, in an oriented state has been known. In the optical element, a helix axis of the liquid crystal is perpendicularly Grandjean oriented to the optical element. Of a parallel incident (incident angle 0 degree) natural light to the helix axis, about a half of a light having a certain wavelength is reflected as a right (or left) circularly polarized light, and the remaining about half of the light is transmitted as a left (or right) circularly polarized light. Its wavelength $\lambda$ is determined by the equation $\lambda = n \cdot p$ (wherein n is an average refractive index and p is a helix pitch of a cholesteric phase). Also, the left and right of the reflected circularly polarized light is determined by the sense of the cholesteric helix and coincides with the sense of cholesteric helix.

In the circular dichroism optical element described above, because an incident light is separated to a reflected light and a transmitted light, there is a possibility of utilizing the reflected light. Thus the optical element is expected to be used in place of a polarizing film formed by adsorbing a dichroism dye, etc., to a stretched film such as a stretched polyvinyl alcohol film, etc. This is because such a polarizing film is frequently used for liquid crystal display apparatus, etc., but the light transmitting as a linearly polarized light is 50% or less of the incident light, and other light is absorbed in the polarizing film and cannot be utilized, which becomes on factor of making it difficult to increase a luminance of the liquid crystal display apparatus and lowering consumed electric power of the apparatus.

However, a conventional circular dichroism optical element is thick and heavy due to the necessity of further using substrates as described above. Thus there is a problem of hindering the attempts of reducing the weight, decreasing the thickness, etc., of a liquid crystal display apparatus. Also, there is a problem that the oriented state such as a helical pitch of a cholesteric liquid crystal is liable to be changed by the change of temperature, etc.

Cholesteric liquid crystal polymers are proposed as described in JP-A-55-21479 (the term "JP-A" as used herein means an "unexamined published Japanese patent application") and U.S. Pat. No. 5,332,522. However, it is difficult to obtain solid materials of films, etc., having a good oriented state as low molecular weight materials, a long time such as several hours is required for the orientation treatment, and further they are poor in the practical use because the glass transition temperature is low and the durability is insufficient. Thus, in any cases, it is difficult to obtain a circular dichroism optical element of a solid state such as a film.

An object of the present invention is to provide a circular dichroism optical element comprising a solid material of a liquid crystal polymer, which is thin and light and in which the oriented state such as a pitch is hard to change at a practical temperature. Also, other object of the present invention is to provide a liquid crystal polymer being excellent in the film-forming property, capable of forming a Grandjean orientation in a good mono-domain state, capable of attaining the orientation treatment in a short time of few minutes, capable of stably fixing in a glass state, and being excellent in the durability and the storage stability.

DISCLOSURE OF THE INVENTION

The present invention provides a circular dichroism optical element characterized by having a solid layer of a liquid crystal polymer comprising a Grandjean oriented cholesteric liquid crystal phase, and a liquid crystal polymer comprising, as the components, a copolymer comprising from 60 to 95% by weight of a monomer unit represented by the following formula (a) and from 40 to 5% by weight of a monomer unit represented by the following formula (b);

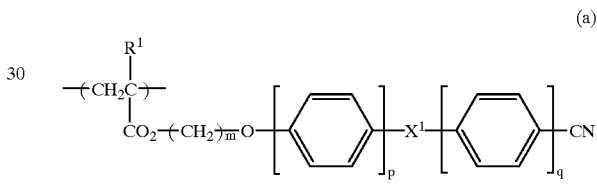

(a)

wherein $R^1$ represents a hydrogen atom or a methyl group; m 5 represents an integer of from 1 to 6; $X^1$ represents a $CO_2$ group or an OCO group; and p and q each represent 1 or 2 and satisfy p+q=3;

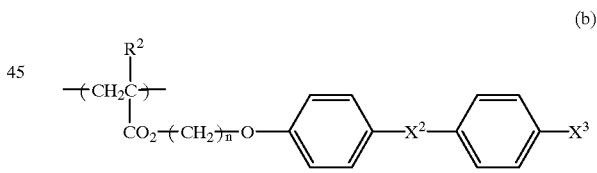

(b)

wherein $R^2$ represents a hydrogen atom or a methyl group; n represents an integer of from 1 to 6; $X^2$ represents a $CO_2$ group or an OCO group; and $X^3$ represents a —CO—$R^3$ or —$R^4$ (wherein $R^3$ represents

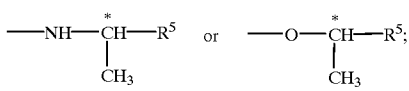

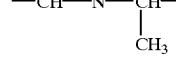 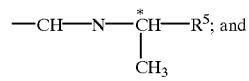

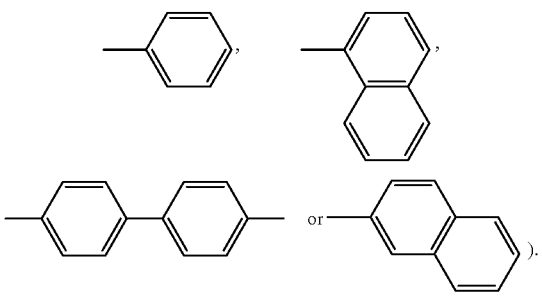

By the above-described constitution, a circular dichroism optical element comprising the solid material of a thin and light liquid crystal polymer can be obtained. Also, by using the liquid crystal polymer of the present invention, a circular dichroism optical element which can easily form a film of a Grandjean orientation of a good mono-domain state with a good film-forming property, can attain the orientation treatment in a short time of few minutes, can stably fix in a glass state, and is excellent in the durability and the storage stability can be formed with a good efficiency. Further, an optical element which can easily control the helical pitch of the cholesteric phase and shows a circular dichroism in a visible light re an be also easily obtained.

BEST MODES FOR CARRYING OUT THE INVENTION

Figure 1:
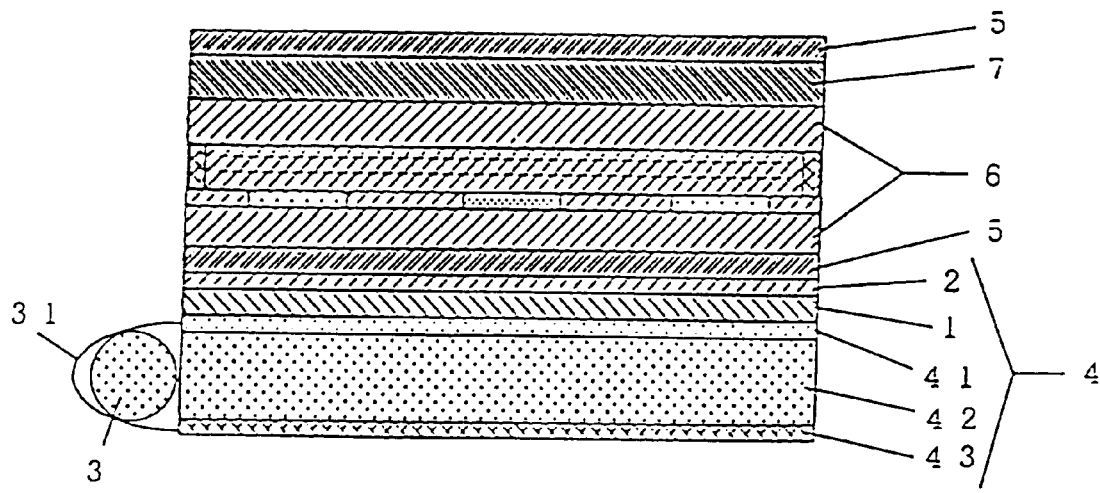
FIG. 1 is an enlarged cross sectional view showing an embodiment of a liquid crystal display apparatus.

The optical element of the present invention has the solid layer of a liquid crystal polymer comprising Grandjean oriented cholesteric liquid crystal phase and shows a circular dichroism. For the formation of such an optical element, a suitable liquid crystal polymer can be used, but the copolymer comprising, as the components, the monomer unit represented by the following formula (a) and the monomer unit represented by the following formula (b) can be preferably used.

(a)

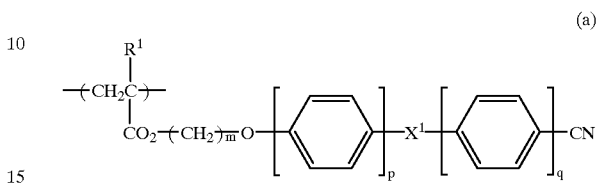

wherein $R^1$ represents a hydrogen atom or a methyl group; m represents an integer of from 1 to 6; $X^1$ represents a $CO_2$ group or an OCO group; and p and q each represent 1 or 2 and satisfy p+q=3;

(b)

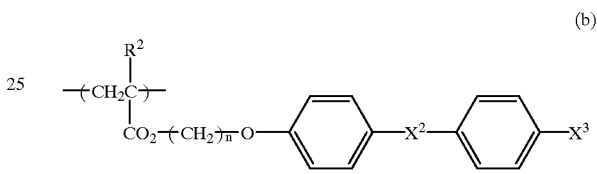

wherein $R^2$ represents a hydrogen atom or a methyl group; n represents an integer of from 1 to 6; $X^2$ represents a $CO_2$ group or an OCO group; and $X^3$ represents a —CO—$R^3$ or —$R^4$ (wherein $R^3$ represents

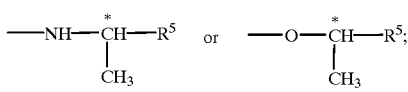

$R^4$ represents

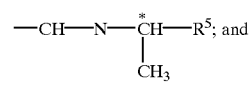

$R^5$ represents the following group

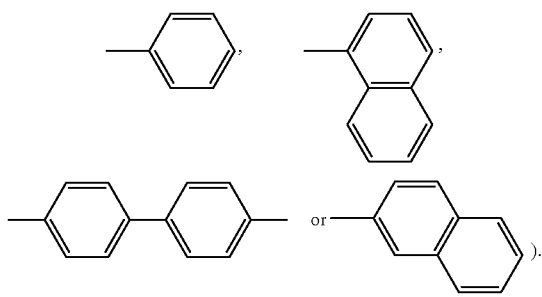

(Meth)acrylic monomers capable of forming the monomer units represented by the above-described formula (a) and formula (b) can be synthesized by appropriate methods. For example, the synthesis example of the (meth)acrylic monomer represented by the following formula (a1) is shown below.

(a1)

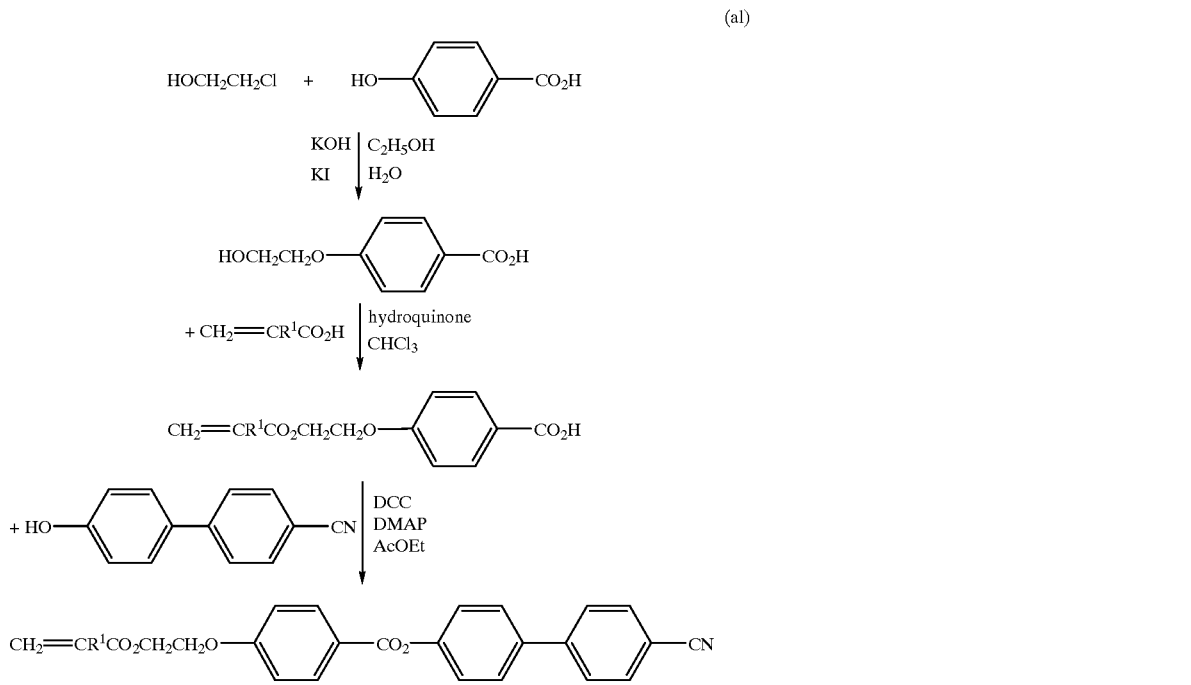

That is, in the above-described synthesis example, first, after obtaining hydroxycarboxylic acid by heating ethylene chlorohydrin and 4-hydroxybenzoic acid under reflux in an aqueous alkali solution in the presence of potassium iodide as a catalyst, the acid is subjected to a dehydration reaction with acrylic acid or methacrylic acid to form a (meth) acrylate, and by esterifying the (meth)acrylate with 4-cyano-4'-hydroxybiphenyl in the presence of DCC (dicyclohexylcarbo-diimide) and DMAP (dimethylaminopyridine), the desired product of the formula (a1) can be obtained.

Also, the synthesis example of the (meth)acrylic monomer represented by the following formula (b1) is shown below.

(b1)

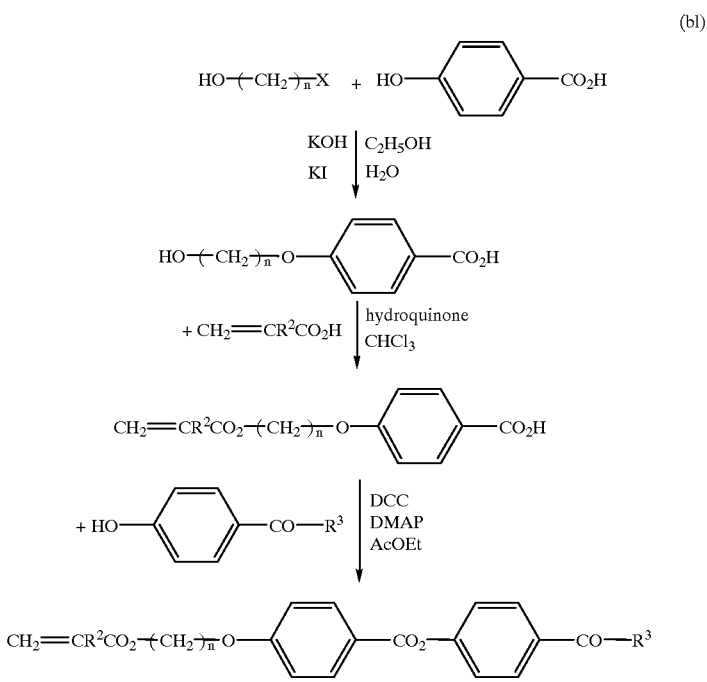

In the above-described synthesis example, first, after obtaining hydroxycarboxylic acid by heating a hydroxyalkyl halide and 4-hydroxybenzoic acid under reflux in an aqueous alkali solution in the presence of potassium iodide as a catalyst, the acid is subjected to a dehydration reaction with acrylic acid or methacrylic acid to form a (meth)acrylate, and by esterifying the (meth)acrylate with a phenol having a CO group containing the $R^3$ group at the 4-position in the presence of DCC and DMAP, the desired product of the formula (b1) can be obtained.

In addition, the phenol having the CO group containing the $R^3$ group at the 4-position can be obtained by, first, reacting methyl chloroformate and 4-hydroxybenzoic acid in an aqueous alkali solution to form a carboxylic acid, after converting the carboxylic acid to an acid chloride with oxalyl chloride, reacting the acid chloride with H—$R^3$ in a mixture of pyridine and tetrahydrofuran to introduce the $R^3$ group to the acid chloride, and then removing a protective group by treating the product with aqueous ammonia as, for example, shown below.

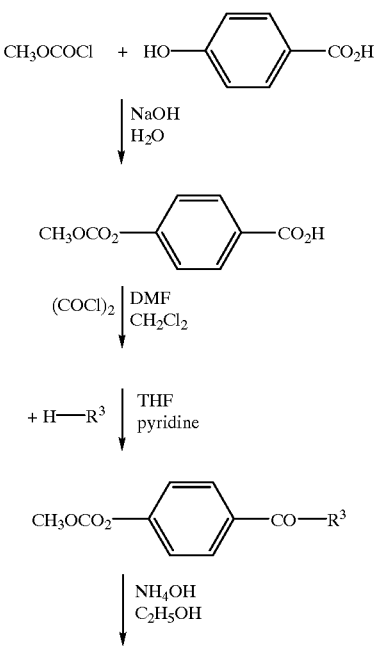

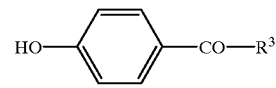

In the synthesis of (meth)acrylic monomer represented by the above formula (b1), by changing the following compound

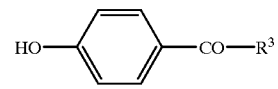

which is added in the final step, to the following compound, the (meth)acrylic monomer represented by the following formula (b2) can be obtained.

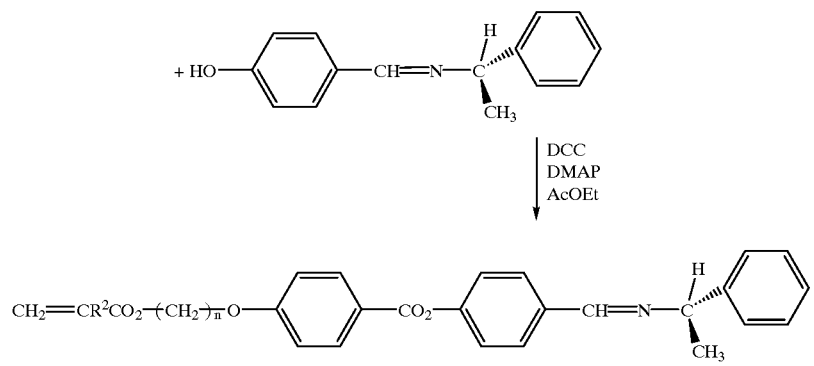

(b2)

That is, after subjecting hydroxycarboxylic acid to dehydration reaction with (meth)acrylic acid to form a (meth)acrylate, by esterifying the (meth)acrylate with a phenol having an asymmetric carbon group at the 4-position in the presence of DCC and DNAP, the desired product represented by the above formula (b2) can be obtained.

In addition, the phenol having an asymmetric carbon group at the 4-position thereof can be obtained by azeotropically dehydrating 4-hydroxybenzaldehyde and (S) -(−)-1-phenylethylamine in toluene, for example, as shown below.

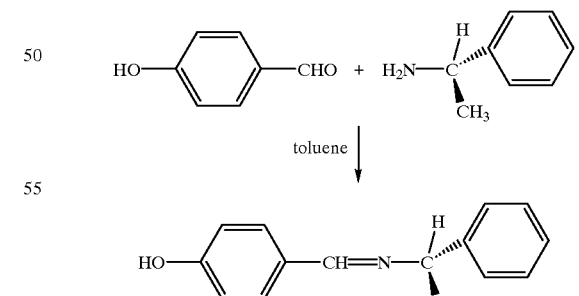

Accordingly, other (meth)acrylic monomers capable of forming the monomer units represented by the formula (a) and the formula (b) described above can be synthesized according to the above-described synthesis examples using appropriate raw materials each having a desired group to be introduced.

The liquid crystal polymer used for the formation of the optical element is the copolymer of one or more kinds of the monomer units represented by the formula (a) described above and one or more kinds of the monomer units represented by the formula (b) described above. In regard to the copolymerization ratio, it is preferred that the monomer unit represented by the formula (a) is from 60 to 95% by weight and the monomer unit represented by the formula (b) is from 40 to 5% by weight because if the content of the monomer unit represented by the formula (b) is too much, the copolymer becomes poor in the liquid crystal property and if the content thereof is too less, the copolymer becomes poor in the cholesteric liquid crystal property.

If the molecular weight of the copolymer is too low, the copolymer becomes poor in the film-forming property and if the molecular weight is too high, the copolymer becomes poor in the orientation property and the formation of monodomain as liquid crystal, whereby a uniform oriented state is hard to form. Therefore, the molecular weight of the copolymer is from 2,000 to 100,000, and preferably from 2,500 to 50,000 based on the weight average molecular weight.

The preparation of the copolymer can be carried out according to a conventional polymerization method of (meth)acrylic monomers, such as a radical polymerization method, a cation polymerization method, or an anion polymerization method. In applying a radical polymerization method, various kinds of polymerization initiators can be used. A polymerization initiator which is decomposed at an intermediate temperature, that is, the decomposition temperature of which is neither high nor low, such as azobisisobutyronitrile, or benzoyl peroxide, is preferably used.

Figure 3:
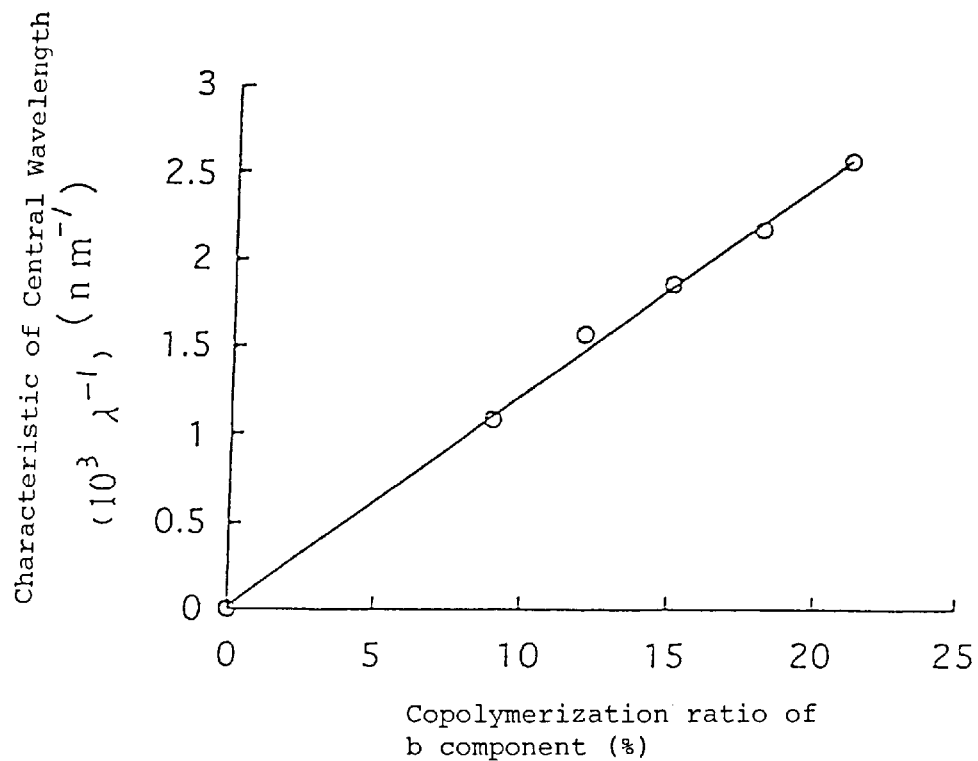
FIG. 3 is a graph showing the relationship between the content of the monomer unit of the formula (b) and the central wavelength showing a circular dichroism.
Figure 4:
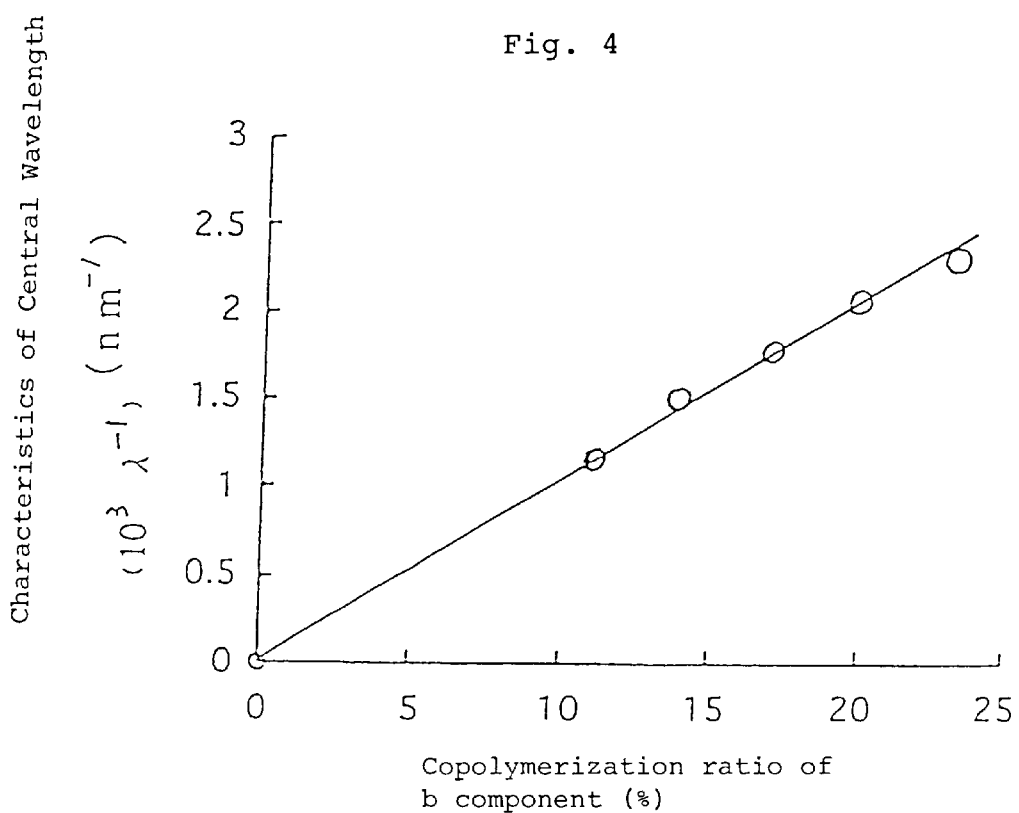
FIG. 4 is a graph showing another relationship between the content of the monomer unit of the formula (b) and the central wavelength showing a circular dichroism.

The copolymer changes the halical pitch of the cholesteric liquid crystal based on the content of the monomer unit represented by the formula (b). The relationship between the content of the monomer unit represented by the formula (b) and the central wavelength showing a circular dichroism is illustrated in FIG. 3 and FIG. 4. In the graph of FIG. 3, the monomer represented by the formula (a2) and the monomer represented by the formula (b2) in the Examples described below are used as the monomer components for the copolymer, and in the case of FIG. 4, the monomers represented by the formulae (a2) and (b6) are used as the monomer components for the copolymer. Because the wavelength showing the circular dichroism is determined by the helical pitch, the wavelength showing the circular dichroism can be controlled by controlling the content of the monomer unit represented by the formula (b) described above. Accordingly, as shown in the examples described below, the optical element showing the circular dichroism to the light in a visible light region can be easily obtained.

One or more kinds of the copolymers can be used for forming the optical element. By mixing 2 or more kinds of the copolymers each having the different wavelength region showing the circular dichroism, the wavelength region showing the circular dichroism can be also controlled. In the present invention, from the points of the durability of the optical element obtained, the stability or the unchanging property of the orientation characteristics, such as the helical pitch, to the temperature change at practical use, and the like, the liquid crystal polymer having a glass transition temperature of 80° C. or more can be preferably used for the formation of the optical element.

In addition, in the present invention, homopolymers each composed of one or more monomer units represented by the formula (a) or the formula (b) described above, the homopolymers, each being based on the formula, can be used for forming the optical element as the liquid crystal polymer of the mixed system of the formula (a) series polymer and the formula (b) series polymer. The mixing ratio, the molecular weight, etc., can be determined according to the copolymers described above.

The formation of the optical element showing the circular dichroism can be carried out by the method according to a conventional alignment technique. For example, as an example thereof, there is a method that after forming an alignment film comprising polyimide, polyvinyl alcohol, etc., on a substrate and rubbing the film with a rayon cloth, etc., a liquid crystal polymer is spread thereon followed by heating at a temperature higher than the glass transition point and lower than the isotropic phase transition temperature, the film thus heated is cooled in the state that the liquid crystal polymer molecule is Grandjean oriented to form a glass state, and thus a solid layer that the orientation is fixed is formed.

As the substrate described above, films comprising plastics such as triacetyl cellulose, polyvinyl alcohol, polyimide, polyarylate, polyester, polycarbonate, polysulfone, polyether sulfone, or epoxy series resins; glass plates; and the like can be used. The solid layer of the liquid crystal polymer formed on the substrate can be used as an optical element as it is in a body with the substrate or is released from the substrate and can be used as an optical element comprising the film.

For spreading the liquid crystal polymer, the polymer can be spread by a heat-melting method or as a solution thereof in a solvent. As the solvent, an appropriate solvent such as methylene chloride, cyclohexanone, trichloroethylene, tetrachloroethane, N-methylpyrrolidone, or tetrahydrofuran can be used. Spreading can be carried out using an appropriate coating means such as a bar coater, a spinner, or a roll coater.

The thickness of the solid layer of the liquid crystal polymer formed is from 0.5 to 20 $\mu$m, and preferably from 1 to 10 $\mu$m because if the thickness is too thin, the solid layer becomes hard to show the circular dichroism and if the thickness is too thick, the solid layer is poor in the uniform orienting property and thus does not show the circular dichroism, and further it requires a long time for the orientation treatment. In addition, in the formation of the optical element, various additives such as polymers other than the copolymer, a stabilizer, a plasticizer, a metal, etc., can be, if necessary, compounded with the copolymer.

The optical element of the present invention shows a circular dichroism. However, in a single solid layer of the liquid crystal polymer, there is usually limitation in the wavelength region showing the circular dichroism. The limitation is usually broad ranging over the wavelength region of about 100 nm. However, in applying the optical element to a liquid crystal display apparatus, it is desired that the optical element shows the circular dichroism in the whole region of visible light.

In the present invention, by laminating plural solid layers of liquid crystal polymers each showing the circular dichroism to a light of a different wavelength, the wavelength region showing the circular dichroism can be expanded. Such a lamination of plural solid layers is advantageous in the point of coping with the wavelength shift of an oblique incident light in addition of expanding the wavelength region described above. In the lamination, 2 or more solid layers can be laminated in the combination of different central wavelengths of the reflected circularly polarized light. In the lamination of the solid layers, it is preferred to use a pressure-sensitive adhesive to reduce the surface reflection loss at each interface.

For example, by using solid layers of the liquid crystal polymers having the central wavelengths of the reflected circularly polarized light of from 300 to 900 nm in the combination of reflecting the circularly polarized lights to the same direction and in the combination that the central wavelengths of selective reflections differ from each other, in particular, each 50 nm or more differ, and laminating from 2 to 6 kinds of the solid layers, an optical element showing the circular dichroism in a wide wavelength region can be formed. In addition, the point of using the combination of the solid layers reflecting the circularly polarized lights to the same helical sensse is the purposes of preventing the circularly polarized lights reflected at the solid layer from becoming different polarized states in each wavelength region and of improving the efficiency in the case of reutilizing the reflected circularly polarized lights via reflection layers, etc.

The optical element of the present invention separates an incident light to left and right circularly polarized lights based on the circular dichroism and supplies the separated circularly polarized lights as a transmitted light and a reflected light and can be preferably applied to various apparatus such as a direct-vision-type liquid crystal display apparatus, etc., which is excellent in the wideness of the view field angle, show the small change of the optical characteristics to the change of the view angle, and can be also directly observed from oblique directions. In particular, the optical element of the present invention can improve the utilization efficiency of light by reutilizing the reflected circularly polarized light via a reflection layer, etc., and can be preferably used as a backlight system in a liquid crystal display apparatus because of the easiness of increasing the area, etc., of the optical element.

Figure 2:
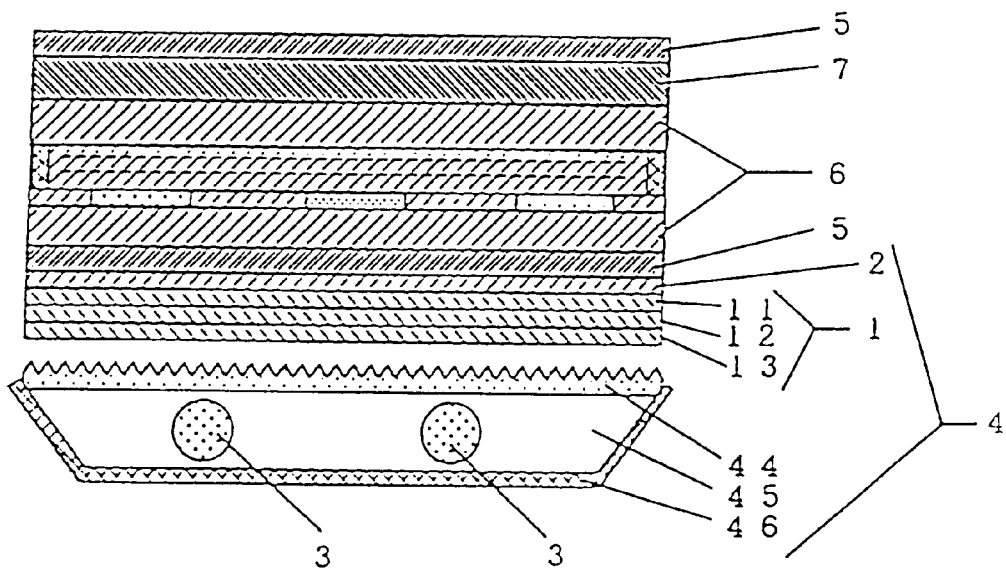
FIG. 2 is an enlarged cross sectional view showing another embodiment of a liquid crystal display apparatus.

FIG. 1 and FIG. 2 illustrate the liquid crystal display apparatus using the optical elements of the present invention as the backlight systems. In FIGS. 1 and 2, the numeral 1 is an optical element, 2 is a retardation layer, and 3 is a light source. Also, the numeral 5 is a polarizing film and 6 is a liquid crystal cell. In addition, the numerals 11, 12, and 13 are liquid crystal polymer solid layers for forming the laminate-type optical element, 31 a light source holder, 41 and 44 are light diffusion plates, 42 is a light emitting layer, 43 and 46 are reflection layers, 45 is a space, and 7 is a retardation film for compensation.

A liquid crystal display apparatus is generally constituted by suitably assembling constituting parts such as a polarizing film, a liquid crystal cell, a backlight, and, if necessary, a retardation film for compensation, etc., and incorporating therein a driving circuit. In the present invention, there are no particular restrictions except that a light is incident to the liquid crystal cell 6 via the optical element 1 and the retardation layer 2 for converting the circularly polarized light to a linearly polarized light, and the liquid crystal display apparatus can be constituted according to the conventional manner.

Accordingly, the liquid crystal display apparatus in the present invention may be the liquid crystal display apparatus requiring that a polarized light is incident to the liquid crystal cell. The optical element of the present invention can be preferably used for the liquid crystal display apparatus using a twist nematic liquid crystal, or a super twist nematic liquid crystal, but the optical element can be also used for the liquid crystal apparatus using a non-twist liquid crystal, a guest-host liquid crystal formed by dispersing a dichroic dye in a liquid crystal, or a ferroelectric liquid crystal. There is no particular restriction on the driving system of the liquid crystal.

In the examples shown in the drawings, the liquid crystal display apparatus each having the polarizing film 5 at both sides of the liquid crystal cell 6 are shown, but the polarizing film at the backlight side can be omitted in the case that the light excellent in the linear polarizing property can be supplied via the optical element, etc. The linear polarization, that is, the linear polarization of the circularly polarized light outgoing from the optical element, is carried out via the retardation layer 2 disposed on the optical element 1. Accordingly, the liquid crystal cell is disposed on the retardation layer 2 in the backlight system.

The object of the retardation layer for converting the circularly polarized light out coming from the optical element to a linearly polarized light is that the phase of the circularly polarized light outcoming from the optical element is changed to be converted to a state having large linearly polarized light components to form a light liable to transmit through the optical element. Accordingly, as the retardation layer, a retardation layer capable of forming many linearly polarized light corresponding to the retardation of a ¼ wavelength from the circularly polarized light outcoming from the optical element and capable of converting the light having other wavelengths to a flat elliptically polarized light having the long diameter direction to the direction as parallel as possible to the foregoing linearly polarized light and being as near as possible the linearly polarized light can be preferably used.

By disposing the retardation layer as described above, that is, by disposing the retardation layer such that the linearly polarized light direction of the light outcoming from the optical element and the long diameter direction of the elliptically polarized light become as parallel as possible to the transmitting axis of the polarizing plate, the light in the state having many linearly polarized light components capable of transmitting through the polarizing film can be obtained.

The retardation layer which can be formed from an appropriate material and give a transparent and uniform retardation is preferred. In general, a retardation film comprising a stretched film of a plastic such as polycarbonate, a one-direction oriented material or a twist oriented material of a nematic liquid crystal polymer, etc., are used as the retardation layer.

The retardation of the retardation layer can be appropriately determined according to the wavelength region of the circularly polarized light transmitted through the optical element. For example, in a visible light region, from the points of the wavelength characteristics and the practical use, by including that almost all the retardation films show the wavelength dispersion of a positive birefringence from the material characteristics, a retardation layer having a small retardation, in particular, giving a retardation of from 100 to 200 nm, is frequently preferably used.

The retardation layer can be formed as a single layer or as two or more layers. In the case of a retardation layer composed of a single layer, the retardation layer showing a small wavelength dispersion of a birefringence is preferred because in this case, the polarized state per wavelength can be uniformalized. On the other hand, multilayering of the retardation layer is effective for the improvement of the wavelength characteristics in the wavelength region and the combination of the layers may be appropriately determined according to the wavelength region, etc.

In the case of employing two or more layered retardation layer for the object of a visible light region, it is preferred to include the layer giving the retardation of from 100 to 200 nm as odd layers as described above from the point of obtaining the light having many linearly polarized light components. It is preferred that layer(s) other than the layers are formed by the layer usually giving a retardation of from 200 to 400 nm from the point of improving the wavelength characteristics, but the present invention is not limited to this.

In the liquid crystal display apparatus illustrated above, the reflection layer 43 or 46 is formed at the bottom of the back light system to reflect the reflected circularly polarizedlight by the optical element 1 via the reflection layer and the reflected light is incident to the optical element again as a return light, whereby the utilization efficiency of light is improved. That is, the reflected circularly polarized light by the optical element is confined between the optical element and the reflection layer and the reflection of the circularly polarized light thus confined is repeated between the optical element and the reflection layer to be converted to a circularly polarized light state capable of transmitting through the optical element, whereby the unutilization of the light by the reflection loss, etc., is reduced.

By the above, the content of the light component absorbed by the polarizing film is lowered by converting the circularly polarized light to a linearly polarized light via the retardation layers and also the light which has hitherto become a reflection loss and an absorption loss can be effectively utilized, whereby the utilization efficiency of light is improved and a liquid crystal display apparatus which is bright and excellent in the viewing property can be formed.

As the reflection layer described above, a layer of causing a reflection and an inversion of light, such as a metal surface composed of aluminum, silver, etc., is preferably used. By using the above-described layer, the left and the right of the reflected circularly polarized light are inverted and the reflected circularly polarized light can be converted to the same state as the circularly polarized light at the transmitted side, whereby the transmission efficiency of light can be improved and the utilization efficiency of light can be efficiently increased. In addition, in a diffusion reflection layer typified by, for example, an uneven surface, the polarized light states based on the diffusion are randomly mixed, whereby the polarized light states are dissolved and the utilization efficiency of light can be improved.

As the light emitting layer, a proper layer outgoing a light to one side thereof can be used. Preferably, a light emitting layer efficiently outgoing light without absorption is used.

A side light type backlight (FIG. 1) known in a liquid crystal display apparatus wherein a light source 3 such as a linear light source as a (cold or hot) cathode ray tube, etc., and a light emitting diode, etc., is disposed as the side surface of a light guiding plate 42 and the light transmitted in the light guiding plate outgoes to one side of the plate by a diffusion, a reflection, a diffraction, an interference, etc., and an EL lamp or a directly under-type lamp (FIG. 2) are examples of the light source. The optical element is disposed at the light outgoing side of such a light emitting layer.

In the above, the light guiding plate outgoing the transmitted light in the inside thereof to one side can be obtained by, for example, forming a diffusion material in a dot form or a stripe form to the light outcoming surface or the back surface of a transparent or translucent resin plate or by imparting an uneven structure to the back surface of the resin plate.

At the formation of the light emitting layer, an appropriate composite can be formed by, if necessary, disposing auxiliary means such as a light diffusion plate 41 or 44 for obtaining a uniformly emitted light, a prism sheet for controlling the light outgoing direction, a reflection means for returning a leaked light, or a light source holder 31 for introducing the outgoing light from a linear light source to the side surface of the light conductive plate.

From the point of obtaining a display having a good contrast ratio by the incident of a high linearly polarized light, as the polarizing film, in particular, as the polarizing film at the back light side, that is, as the polarizing film of the side near the optical element disposed at the incident side of the viewing light in the liquid crystal cell, a polarizing film having a high degree of polarization, such as an iodine series or dye series absorption-type linear polarizer, is preferably used.

The liquid crystal display apparatus and the forming parts such as the backlight system may be laminated in a body or in separated states. Also, in the formation of the liquid crystal display apparatus, proper optical elements such as a diffusion plate and an anti-glare layer formed on the polarizing film at the viewing side, a reflection preventing film, a protective layer or a protective plate, a retardation film for compensation formed between the liquid crystal cell, or the polarizing film can be properly disposed. In using a combination of the optical element and the retardation layer, they may be laminated in a body or may be in separated states. The disposing position thereof is the state that the optical element is interposed between the light outgoing side of the light emitting layer and the retardation layer.

The retardation film for compensation described above is used for the purpose of improving the viewing property by compensating the wavelength dependence of berefringence, etc., and is shown by the numeral 7 in FIG. 1 and FIG. 2. In the present invention, the retardation film for compensation is, if necessary, disposed between the liquid crystal cell at the viewing side and/or the backlight side and the polarizing film. As the retardation film for compensation, an appropriate material can be used according to the wavelength region, etc., and the foregoing retardation film may be formed as a single layer or a laminate layer of two or more layers.

As described above, in the liquid crystal display apparatus according to the present invention, by re-utilizing the reflected circularly polarized light by the optical element as an outgoing light by the conversion of the polarized light via the reflection layer, etc., the reflection loss of light is prevented and also by converting the outcoming light to a light state richly containing the polarizing film transmitting linearly polarized light components by controlling the phase of the outcoming light via the retardation layer, the absorption loss of light by the polarizing film is prevented, whereby the utilization efficiency of light can be improved.

It is preferred that the light outgoing from the retardation layer contains at least 65%, particularly at least 70%, of the linearly polarized light components capable of transmitting the polarizing film as the linearly polarized light or the long diameter direction components of the elliptically polarized light. Also, from the point of preventing the occurrence of a color change of the display, it is preferred that in the combination of the optical element and the retardation layer, the incident light of a natural light outgoes as a polarized light of the state that the color change ∴ab based on the National Institute of Standards and Technology system is 10 or lower. The lamination of the liquid crystal polymer solid layers is advantageous from the point of reducing such a color change.

In this case, the disposition angle between the polarizing axis of the polarizing film at the backlight side and the fast axis or slow axis of the retardation film can be appropriately determined according to the retardation characteristics of the retardation layer, the characteristics of the incident circularly polarized light, etc. For example, in the case of the retardation film giving the retardation of from 100 to 200 nm described above, when a left circularly polarized light is incident, by making the disposition angle of the fast axis of the retardation film from 0 to 90 degree, preferably from 35 to 55 degree, and particularly preferably 45 degree, on the basis (0 degree) of the polarizing axis of the polarizing film, the polarizing film transmitting light can be improved.

On the other hand, when a right circularly polarized light is incident, by carrying out the setting of the foregoing angle based on the slow axis of the retardation film, the polarizing film transmitting light can be improved. In the case of the retardation film of two or more layers, in particular, when a layer giving the retardation of from 100 to 200 nm occupies the surface layer at the outside, it is preferred to set the disposition angle based on the layer.

Figure 5:
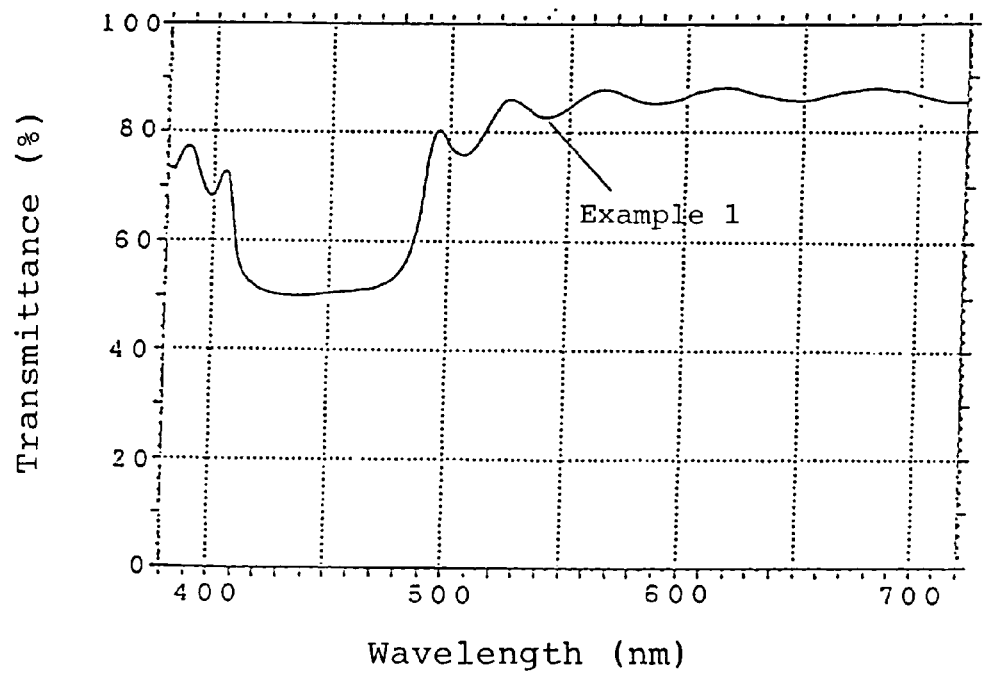
FIG. 5 is a graph showing the transmission characteristics.

EXAMPLE 1 drying, the coated layer was subjected to an orientation treatment by heating at 140° C. for 15 minutes. The layer was allowed to cool to room temperature, whereby the orientation of the liquid crystal polymer was fixed in a glass state. The thickness of the liquid crystal polymer was 2 μm and the film-like optical element composed of a united body of the liquid crystal polymer and the triacetyl cellulose film showed a circularly polarized dichroism mirror surface-like-reflecting a blue light, and the reflected light was a left circularly polarized light having a wavelength of from 410 to 485 nm. The transmission characteristics of the optical element were shown in FIG. 5.

EXAMPLE 2

A copolymer having a weight average molecular weight of 7,500 was obtained and an optical element was obtained, in the same manners as in Example 1 except that 36.3 parts by weight (88 mmols) of the monomer represented by the

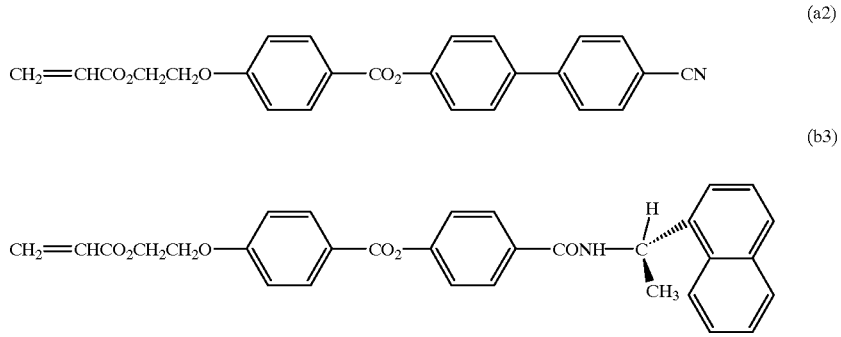

(a2)

(b3)

33.9 Parts by wight (82 mmols) of a monomer represented by the above-described chemical formula (a2) and 9.16 parts by weight (18 mmols) of a monomer represented by the above-described chemical formula (b2) were dissolved by heating in 430 ml of tetrahydrofuran. After stabilizing the system at a temperature of from 55 to 60° C., the inside atmosphere of the reaction vessel was replaced with a nitrogen gas. 5 ml of a tetrahydrofuran solution having dissolved therein 0.5 part by weight of azobisisobutyronitrile was added dropwise to the solution in the absence of oxygen, and the polymerization treatment was carried out for 6 hours. The reaction mixture thus obtained was gradually poured into 3,000 ml of diethyl ether with stirring to obtain precipitates of a white polymer. After subjecting the precipitates to a centrifugal separation, the precipitates were further subjected twice to the reprecipitation purification to obtain a copolymer having a weight average molecular weight of 7,000. The copolymer had a glass transition temperature of 88° C. and an isotropic phase transition temperature of 225° C. and showed a cholesteric structure at a temperature between the above temperatures.

Figure 6:
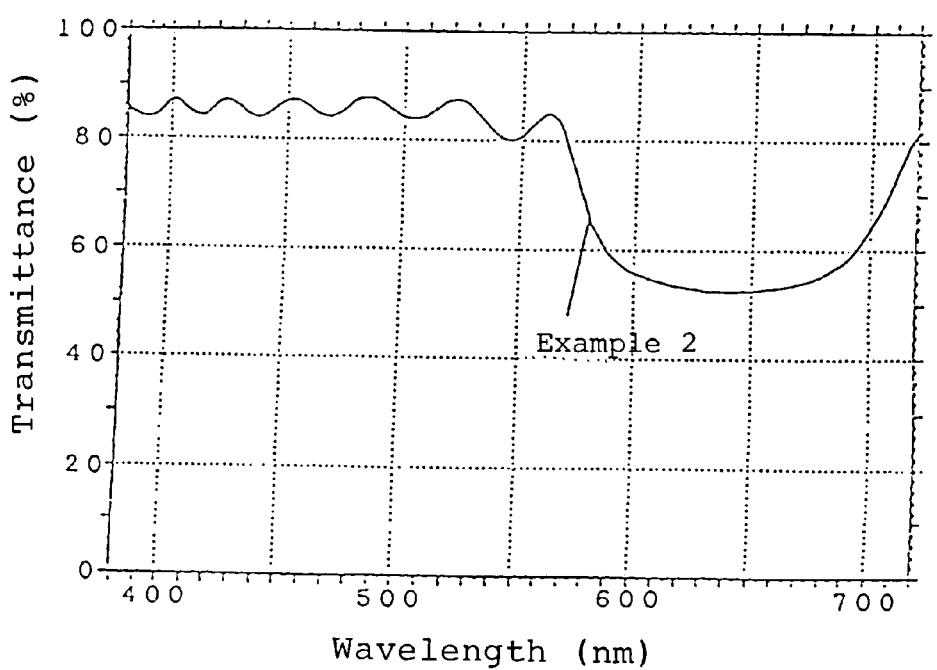
FIG. 6 is a graph showing another transmission characteristics.

A polyvinyl alcohol layer having a thickness of about 0.1 μm was formed on a triacetyl cellulose film having a thickness of 50 μm, and a rubbing treatment was applied to the surface of the layer with a rayon cloth. A methylene chloride solution of 10% by weight the copolymer was coated on the treated surface with a bar coater, and after chemical formula (a2) and 6.11 parts by weight (12 mmols) of the monomer represented by the chemical formula (b3) were used. This copolymer had a glass transition temperature of 92° C. and an isotropic phase transition temperature of 240° C., and showed a cholesteric structure at a temperature between the above temperatures. Also, the optical element showed a circularly polarized dichroism mirror surface-like-reflecting a red light and the reflected light was a left circularly polarized light having a wavelength of from 580 to 695 nm. The transmission characteristics of the optical element were shown in FIG. 6.

EXAMPLE 3

Figure 7:
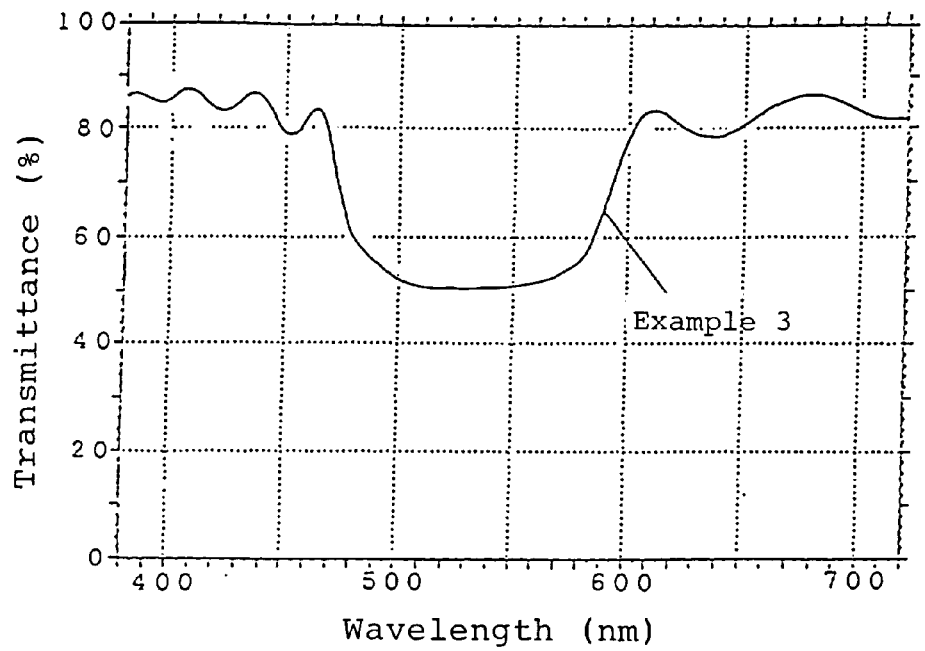
FIG. 7 is a graph showing still another transmission characteristics.

An optical element was obtained in the same manner as in Example 1 using a mixture of the copolymer obtained in Example 1 and the copolymer obtained in Example 2 at a ratio of 0.47/0.53 (Example 1/Example 2). The optical element shows a circularly polymerized dichroism mirror surface-like-reflecting a green light, and the reflected light was a left circularly polarized light having a wavelength of from 480 to 585 nm. The transmission characteristics of the optical element were shown in FIG. 7.

EXAMPLE 4

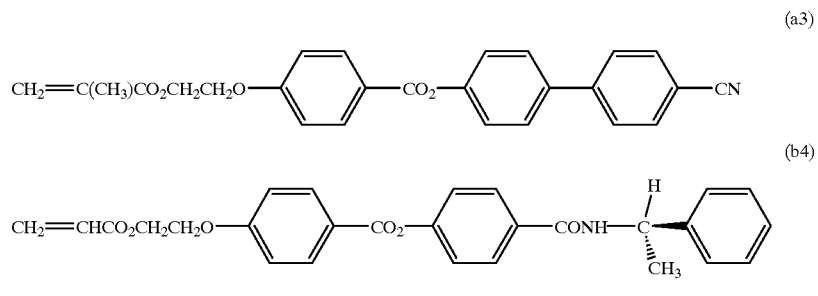

A copolymer having a weight average molecular weight of 11,500 was obtained in the same manner as in Example 1 except that 16.5 parts by weight (40 mmols) of the monomer represented by the chemical formula (a2), 17.1 parts by wight (40 mmols) of a monomer represented by the chemical formula (a3) described above, and 9.18 parts by weight (20 mmols) of a monomer represented by the chemical formula (b4) described above. The copolymer had a glass transition temperature of 105° C. and an isotropic phase transition temperature of 238° C. and showed a cholesteric structure at a temperature between the above temperatures.

Figure 8:
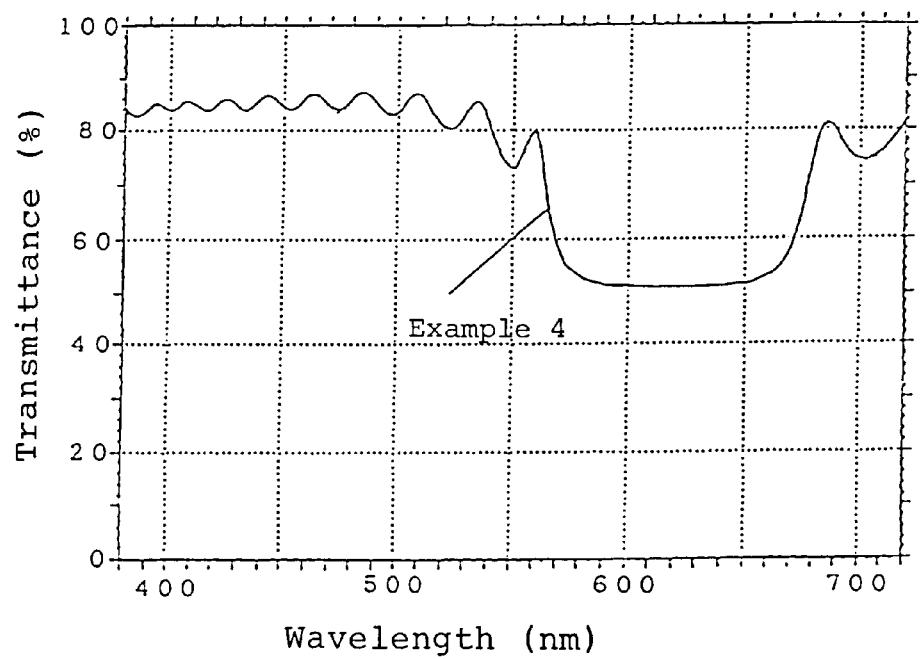
FIG. 8 is a graph showing still another transmission characteristics.

On the other hand, using the copolymer described above, a liquid polymer solid layer having a thickness of 3 μm was formed under the orientation treatment conditions of 150° C. and 15 minutes according to Example 1 to obtain an optical element. The optical element showed a circularly polarized dichroism mirror surface-like-reflecting a red-yellow light, and the reflected light was a right circularly polarized light having a wavelength of from 565 to 675 nm. The transmission characteristics of the optical element were shown in FIG. 8.

EXAMPLE 5

A copolymer having a weight average molecular weight of 21,000 was obtained in the same manner as in Example 1 except that 36.3 parts by weight (85 mmols) of a monomer represented by chemical formula (a4) described below and 9.09 (15 mmols) of a monomer represented by chemical formula (b5) described below. The copolymer obtained had a glass transition temperature of 95° C. and an isotropic phase transition temperature of 215° C., and shows a cholesteric structure at a temperature between the above temperatures.

Figure 9:
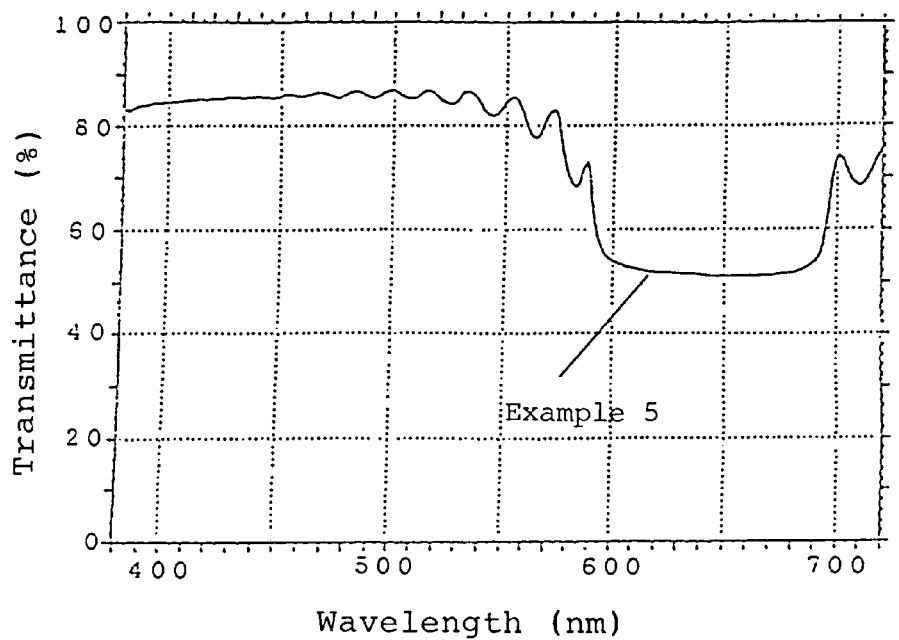
FIG. 9 is a graph showing still another transmission characteristics.

On the other hand, using the copolymer described above, a liquid crystal polymer solid layer having a thickness of 5 μm was formed according to Example 1 to obtain an optical element. The optical element showed a circularly polarized dichroism mirror surface-like-reflecting a red light. The reflected light was a right circularly polarized light having a wavelength of from 590 to 695 nm. The transmission characteristics of the optical element were shown in FIG. 9.

EXAMPLE 6

Figure 10:
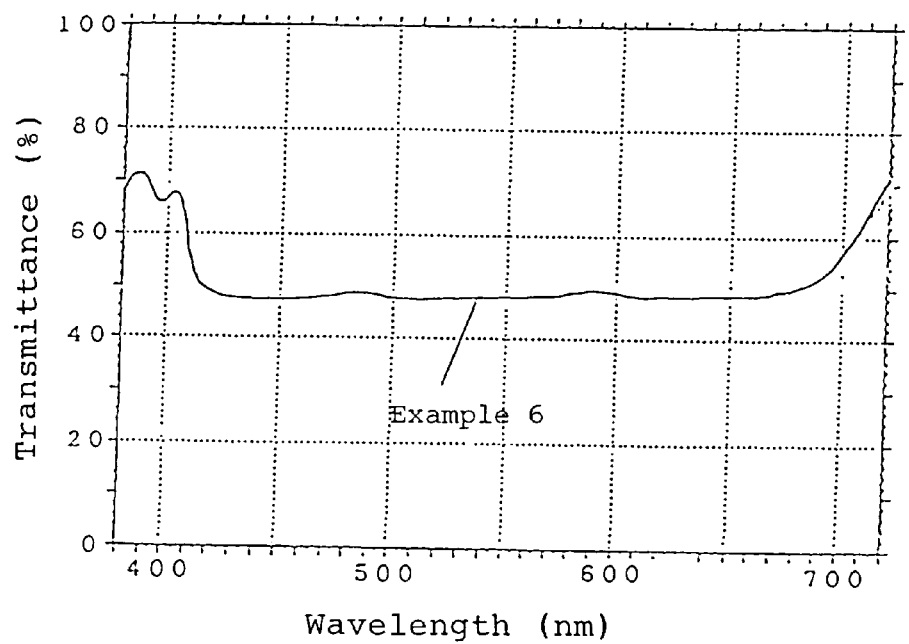
FIG. 10 is a graph showing still another transmission characteristics.

The optical elements obtained according to Examples 1, 2, and 3 were laminated via an acrylic pressure-sensitive adhesive layer to obtain an optical element showing a circularly polarized dichroism in the range of a wavelength of from 410 to 690 nm. The transmission characteristics of the optical element were shown in FIG. 10.

A ¼ wavelength plate made up of the laminate of two stretched films composed of polycarbonate was laminated onto the optical element described above via an acrylic pressure-sensitive adhesive layer. When a natural light was incident to the laminated optical element, the color change Δab based on the NBS system was 3, which was very small. Also, when the optical element having attached thereon the ¼ wavelength film was subjected to a heating test of 80° C. and 1,000 hours or subjected to a wet heat test of 60° C., 90% RH, and 1,000 hours, the changes of the optical properties, the appearance, etc., were not substantially observed in each of the tests, which showed the excellent durability.

Further, when the liquid crystal display apparatus having the constitution according to FIG. 1 was formed using the optical element having attached thereto the ¼ wavelength plate described above, the apparatus showed the luminance of 90 cd/m², which showed the improvement of 50% of luminance as compared with the case (60 cc/m²) of not using such an optical element.

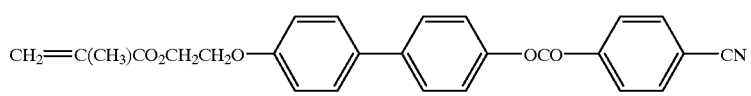

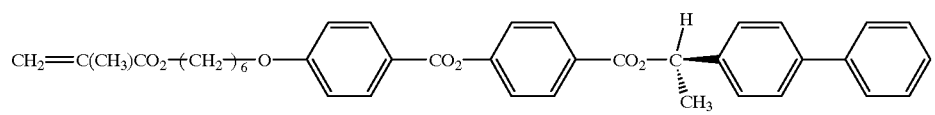

EXAMPLE 7

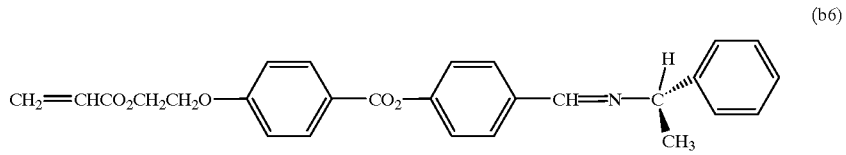
(b6)

Figure 11:
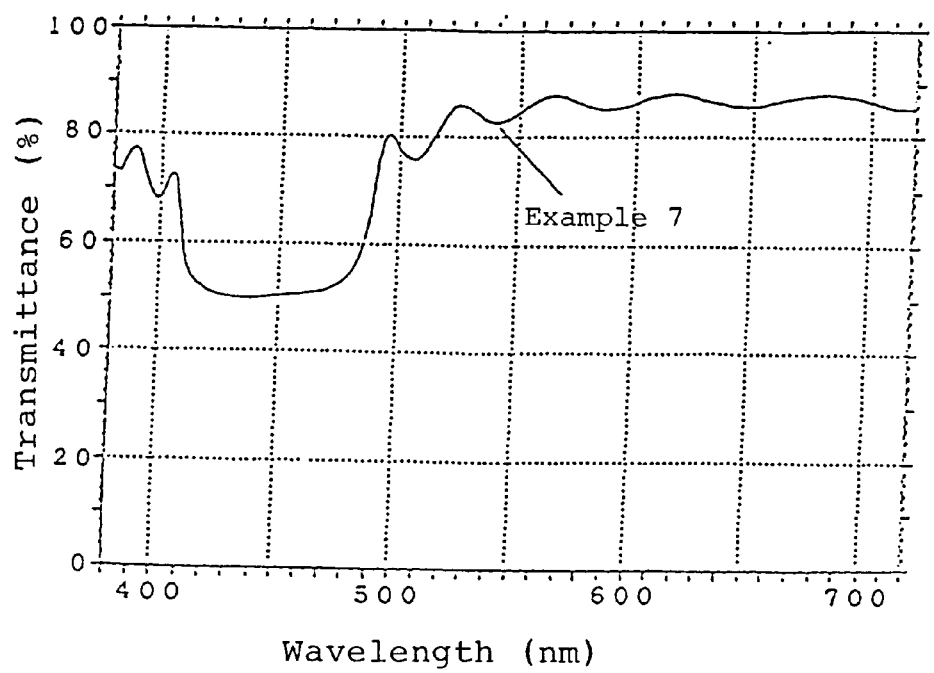
FIG. 11 is a graph showing still another transmission characteristics.

A copolymer having a weight average molecular weight of 7,300, having a glass transition temperature of 85° C. and an isotropic phase transition temperature of 215° C., and showing a cholesteric structure at a temperature between the above temperatures was obtained in the same manner as in Example 1 except that 31.8 parts by weight (77 mmols) of the monomer represented by the chemical formula (a2) described before and 10.2 parts by weight (23 mmols) of the monomer represented by the chemical formula (b6) described above were dissolved in 415 ml of tetrahydrofuran by heating. Using the copolymer, an optical element which showed a circularly polymerized light mirror surface-like-reflecting a blue light and was a left circularly polarized light the wavelength of the reflected light of which was from 410 to 485 nm was obtained by the method of subjecting to a heat orientation treatment at 150° C. and 5 minutes according to Example 1. The transmission characteristics of the optical element were shown in FIG. 11.

EXAMPLE 8

Figure 12:
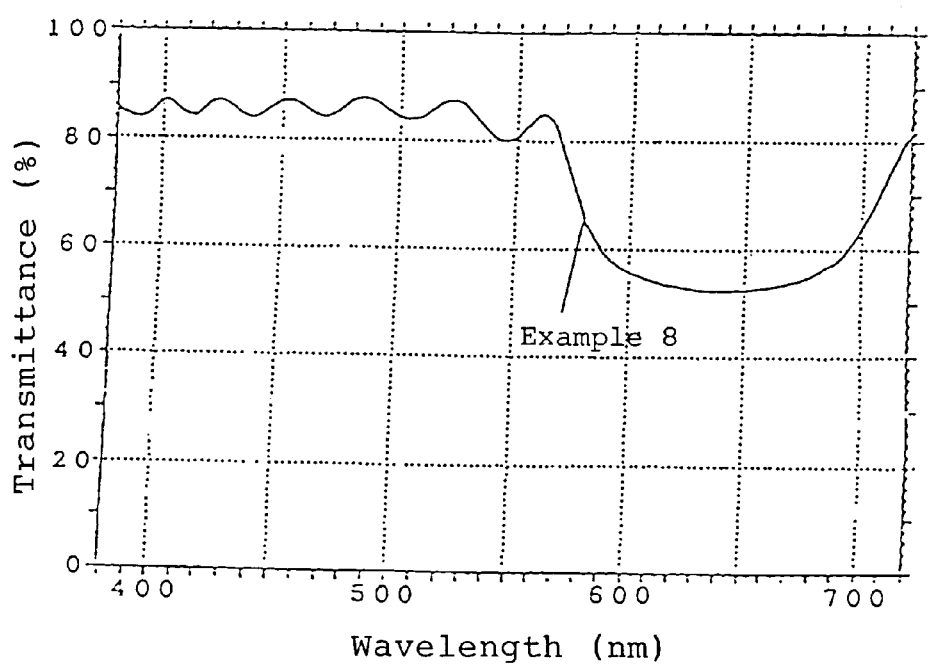
FIG. 12 is a graph showing still another transmission characteristics.

A copolymer having a weight average molecular weight of 7,100 was obtained and an optical element was obtained, in the same manners as in Example 7 except that 35.5 parts by weight (86 mmols) of the monomer represented by the chemical formula (a2) and 6.20 parts by weight (14 mmols) of the monomer represented by the chemical formula (b6) were used. The copolymer had a glass transition temperature of 89° C. and an isotropic phase transition temperature of 230° C., and showed a cholesteric structure at a temperature between the above temperatures. Also, the optical element showed a circularly polarized dichroism mirror surface-like-reflecting a red light, and the reflected light was a left circularly polarized light having a wavelength of from 580 to 695 nm. The transmission characteristics of the optical element were shown in FIG. 12.

EXAMPLE 9

Figure 13:
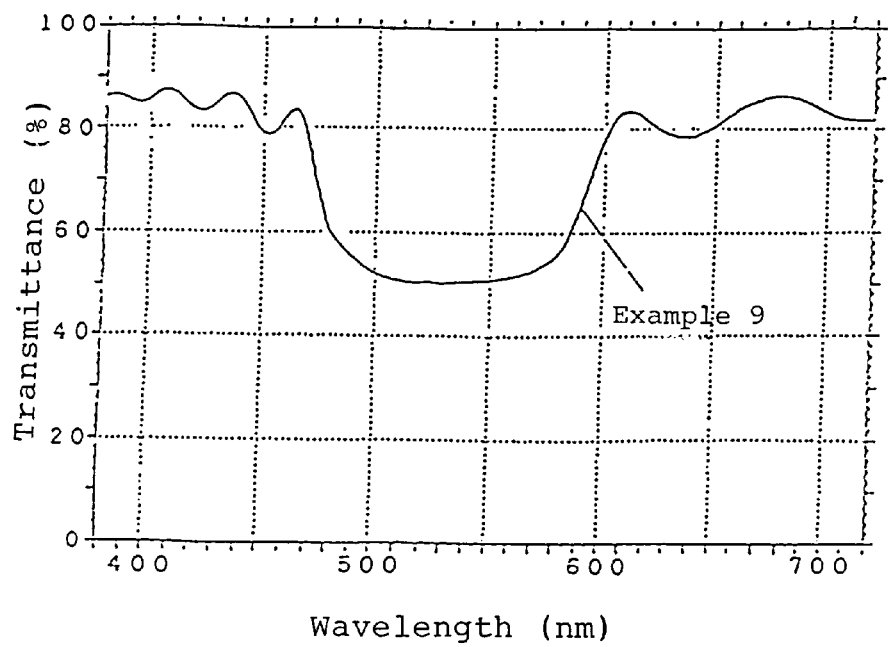
FIG. 13 is a graph showing still another transmission characteristics.

An optical element was obtained according to Example 7 using a mixture of the copolymer obtained in Example 7 and the copolymer obtained in Example 8 at a ratio of 0.47/0.53 (Example 7/Example 8). The optical element showed a circularly polarized dichroism mirror surface-like-reflecting a green light, and the reflected light was a left circularly polarized light having a wavelength of from 480 to 585 nm. The transmission characteristics of the optical element were shown in FIG. 13.

EXAMPLE 10

Figure 14:
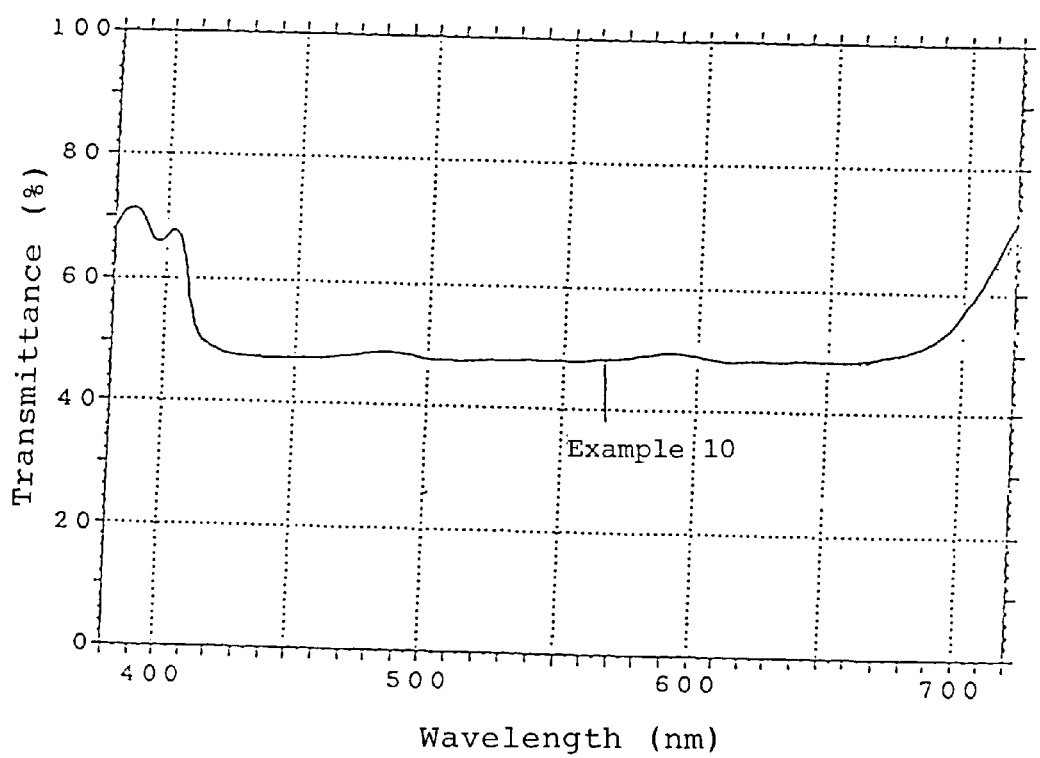
FIG. 14 is a graph showing still another transmission characteristics.

The optical elements obtained according to Examples 7, 8, and 9 were laminated via an acrylic pressure-sensitive adhesive layer to obtain an optical element showing a circular dichroism in the range of a wavelength of from 410 to 690 nm. The transmission characteristics of the optical element were shown in FIG. 14.

A ¼ wavelength film composed of the laminate of two stretched films composed of polycarbonate was laminated onto the optical element described above via an acrylic pressure-sensitive adhesive layer. When a natural light was incident to the laminated optical element, the color change Aab based on the NBS system was 3, which was very small. Also, when the optical element having attached thereon the ¼ wavelength film was subjected to a heating test of 80° C. and 1,000 hours or subjected to a wet heat test of 60° C., 90% RH, and 1,000 hours, the changes of the optical properties, the appearance, etc., were not substantially observed in each of the tests, which showed the excellent durability.

Furthermore, when the liquid crystal display apparatus having the constitution according to FIG. 1 was formed using the optical element having attached thereto the ¼ wavelength film described above, the apparatus showed the luminance of 90 cd/m$^2$, which showed the improvement of 50% of luminance as compared with the case (60 cd/m$^2$) of not using such an optical element.

Comparative Example

A copolymer having a weight average molecular weight of 18,000 was obtained according to Example 1 except that 39.0 parts by weight (80 mmols) of a monomer represented by chemical formula (C) described below and 9.14 parts by weight (20 mmols) of a monomer represented by chemical formula (D) described below. The copolymer obtained had a glass transition temperature of 71° C. and an isotropic phase transition temperature of 205° C. and showed a cholesteric structure at a temperature between the above temperatures.

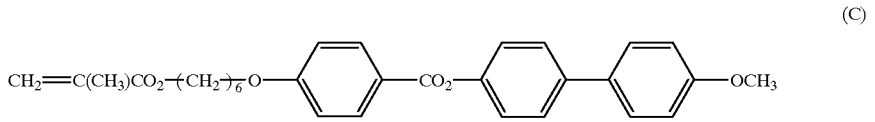
(C)

-continued (D)
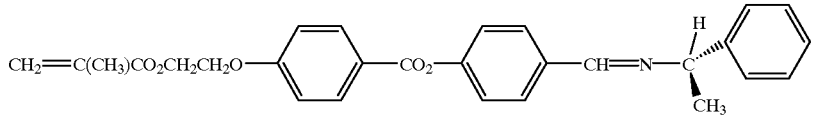

Figure 15:
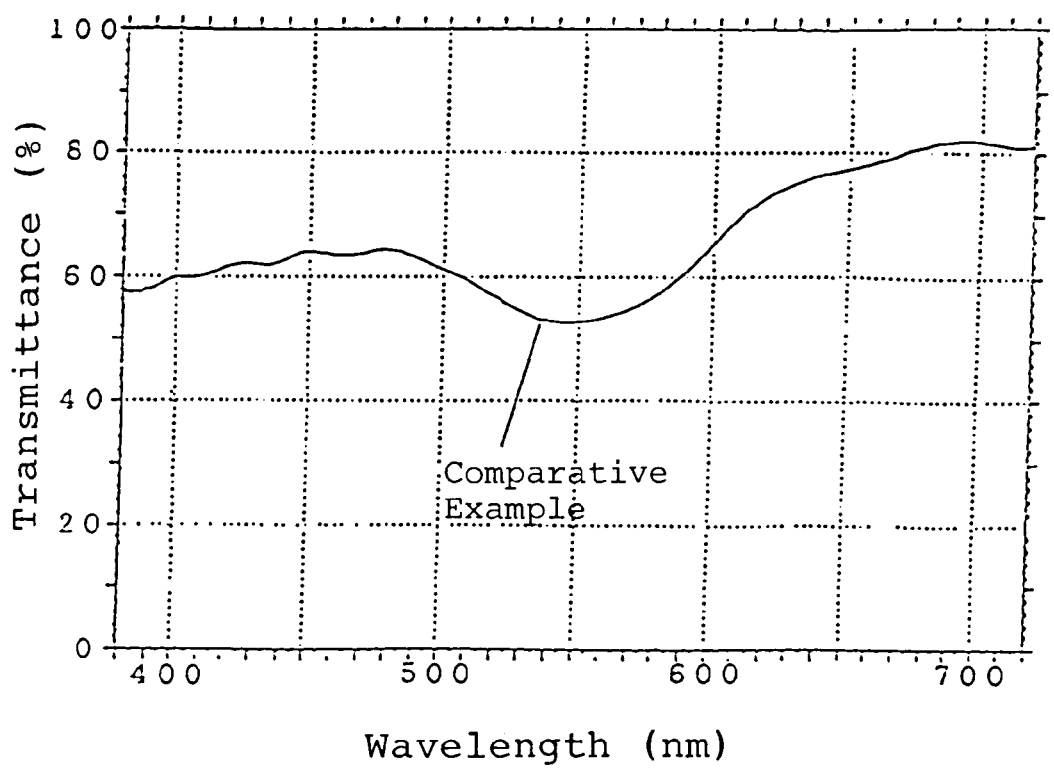
FIG. 15 is a graph showing still another transmission characteristics.

On the other hand, the formation of a liquid crystal polymer solid layer using the copolymer described above was attempted according to Example 1. However, a uniformly oriented material could not be obtained and the liquid crystal polymer layer having a thickness of 3 μm did not show a mirror surface-like reflection, and showed a diffusion reflection. Thus the circular dichroism was insufficient. The transmission characteristics of the optical element were shown in FIG. 15. It is considered that the diffusion reflection is due to that a uniform Grandjean orientation is not formed.

Industrial Applicability

By the present invention, a circular dichroism optical element comprising the solid material of a liquid crystal polymer, which is thin and light and is hard to change the orented state such as a pitch, etc., at a practical temerature, can be obtained, and also a liquid crystal polymer which is excellent in the film-forming property, can form a Grandjean orientation in a good monodomain state, can attain the orientation treatment in a short time of few minutes, can be stably fixed in a glass state and form a circular dichroism optical element excellent in the durability and the storage stability, and can easily control the helical pitch of the cholesteric phase can be obtained.

What is claimed is:

1. A circular dichroism optical element, characterized by having a solid layer of a liquid crystal polymer comprising a Grandjean oriented cholesteric liquid crystal phase, wherein the liquid crystal polymer has a glass transition temperature of 80° C. or more and comprises a copolymer comprising a monomer unit represented by the following formula (a) and a monomer unit represented by the following formula (b):

(a)
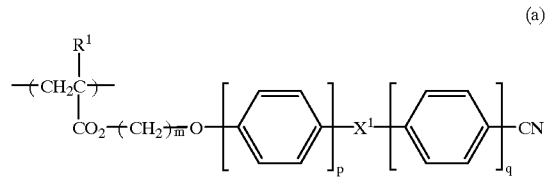

wherein $R^1$ represents a hydrogen atom or a methyl group; m represents an integer of from 1 to 6; $X^1$ represents a $CO_2$ group or an OCO group; and p and q each represent 1 or 2 and satisfy p+q=3, (b)
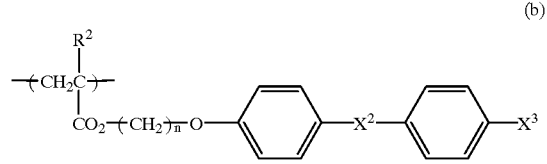

wherein $R^2$ represents a hydrogen atom or a methyl group; n represents an integer of from 1 to 6; $X^2$ represents a $CO_2$ group or an OCO group; and $X^3$ represents —CO—$R^3$ or —$R^4$, wherein $R^3$ represents

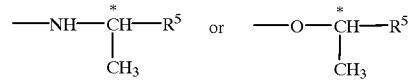

$R^4$ represents

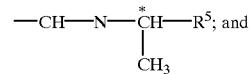

$R^5$ represents the following group

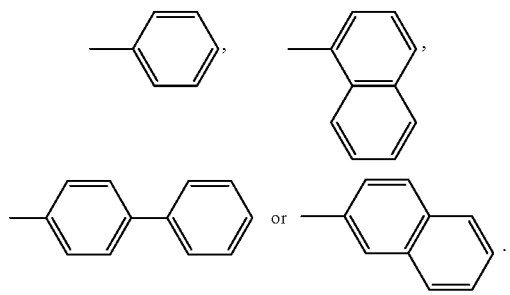

2. An optical element as claimed in claim 1, wherein the optical element shows a circular dichroism to a light of a visible light region.

3. An optical element as claimed in claims 1 or 2, wherein the optical element comprises a laminate of solid layers of liquid crystal polymers each showing an circular dichroism to a light having a different wavelength.

4. An optical element as claimed in claims 1 or 2, wherein the optical element has a retardation layer converting a circularly polarized light to a linearly polarized light.

5. An optical element as claimed in claim 4, wherein an incident light of a natural light is outgone as a polarized light in a state that the color change Δab based on the National Institute of Standards and Technology system is 10 or lower.

6. A liquid crystal display apparatus having the optical element as claimed in claims 2 or 5 at the incident side of a viewing light in a liquid crystal cell.

7. A backlight apparatus having the optical element as claimed in claims 2 or 5 at the light outgoing side.

8. A liquid crystal polymer comprising, as the component, the copolymer comprising from 60 to 95% by weight of the monomer unit represented by the following formula (a) and from 40 to 5% by weight of the monomer unit represented by the following formula (b);

(a)

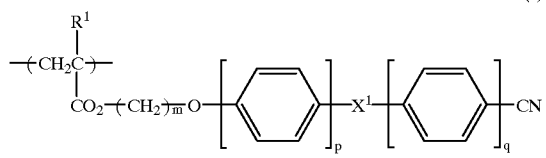

wherein $R^1$ represents a hydrogen atom or a methyl group; m represents an integer of from 1 to 6; $X^1$ represents a $CO_2$ group or an OCO group; and p and q each represent 1 or 2 and satisfy p+q=3, (b)

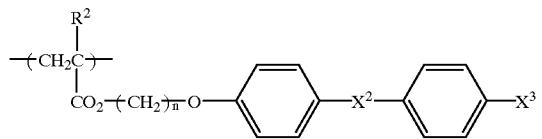

wherein $R^2$ represents a hydrogen atom or a methyl group; n represents an integer of from 1 to 6; $X^2$ represents a $CO_2$ group or an OCO group; and $X^3$ represents —CO—$R^3$ or —$R^4$, wherein $R^3$ represents

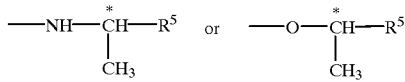

$R^4$ represents

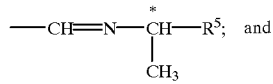

$R^5$ represents the following group

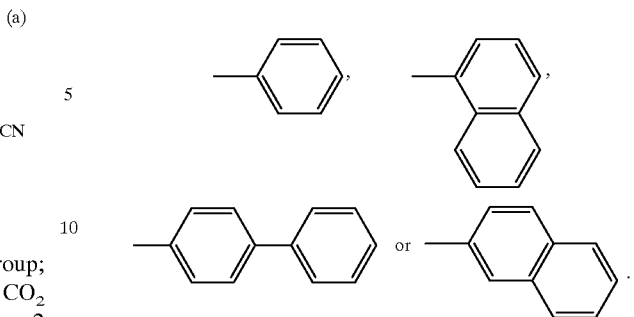

9. An optical element as claimed in claim 3, wherein the optical element has a retardation layer converting a circularly polarized light to a linearly polarized light.

10. An optical element as claimed in claim 9, wherein an incident light of a natural light is outgone as a polarized light in a state that the color change Δab based on the National Institute of Standards and Technology system is 10 or lower.

11. A liquid crystal display apparatus having the optical element as claimed in claim 3 at the incident side of a viewing light in a liquid crystal cell.

12. A liquid crystal display apparatus having the optical element as claimed in claim 4 at the incident side of a viewing light in a liquid crystal cell.

13. A liquid crystal display apparatus having the optical element as claimed in claim 9 at the incident side of a viewing light in a liquid crystal cell.

14. A liquid crystal display apparatus having the optical element as claimed in claim 10 at the incident side of a viewing light in a liquid crystal cell.

15. A backlight apparatus having the optical element as claimed in claim 3 at the light outgoing side.

16. A backlight apparatus having the optical element as claimed in claim 4 at the light outgoing side.

17. A backlight apparatus having the optical element as claimed in claim 9 at the light outgoing side.

18. A backlight apparatus having the optical element as claimed in claim 10 at the light outgoing side.

* * * * *